United States Patent
Brummer et al.

(10) Patent No.: US 11,589,157 B2
(45) Date of Patent: Feb. 21, 2023

(54) AUDIO DEVICE FOR A VEHICLE AND METHOD FOR OPERATING AN AUDIO DEVICE FOR A VEHICLE

(71) Applicant: Bayerische Motoren Werke Aktiengesellschaft, Munich (DE)

(72) Inventors: Marc Brummer, Poing (DE); Yvonne Kuessel, Munich (DE); Julius Rachor, Munich (DE); Maik Schwalm, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/257,602

(22) PCT Filed: Jun. 26, 2019

(86) PCT No.: PCT/DE2019/100591
§ 371 (c)(1),
(2) Date: Jan. 4, 2021

(87) PCT Pub. No.: WO2020/007405
PCT Pub. Date: Jan. 9, 2020

(65) Prior Publication Data
US 2021/0297769 A1    Sep. 23, 2021

(30) Foreign Application Priority Data
Jul. 5, 2018    (DE) ..................... 10 2018 211 127.8

(51) Int. Cl.
*H04R 1/32*        (2006.01)
*B60W 50/14*    (2020.01)
(Continued)

(52) U.S. Cl.
CPC ............. *H04R 1/323* (2013.01); *B60W 50/14* (2013.01); *H04R 5/023* (2013.01); *H04S 7/302* (2013.01);
(Continued)

(58) Field of Classification Search
CPC .... H04R 2499/13; H04R 5/023; H04R 1/323; H04S 7/302; H04S 2400/11; H04S 2400/15; B60W 50/14; B60W 2050/143
(Continued)

(56) References Cited

U.S. PATENT DOCUMENTS 5,979,586 A    11/1999  Farmer et al.
8,838,384 B1 *  9/2014  Daily ................. G01C 21/3629
                                                            381/86
(Continued)

FOREIGN PATENT DOCUMENTS

DE    198 01 205 A1    7/1998
DE    103 45 680 A1    5/2005
(Continued)

OTHER PUBLICATIONS

International Search Report (PCT/ISA/210) issued in PCT Application No. PCT/DE2019/100591 dated Sep. 18, 2019 with English translation (five (5) pages).
(Continued)

*Primary Examiner* — Paul Kim
(74) *Attorney, Agent, or Firm* — Crowell & Moring LLP

(57) ABSTRACT

An audio device for a vehicle includes a loudspeaker system having a plurality of loudspeakers, which are arranged spatially such that they enable a three-dimensional listening experience in a vehicle interior. The audio device also includes a control unit which is coupled to the loudspeaker system and which is configured to control at least one loudspeaker of the loudspeaker system in order to reproduce
(Continued)

a position-specific warning signal which is linked to a specific position. For reproducing the position-specific warning signal, the control unit controls only the loudspeaker or those loudspeakers of the loudspeaker system which is/are closest to the specific position.

18 Claims, 3 Drawing Sheets

(51) Int. Cl.
  *H04S 7/00* (2006.01)
  *H04R 5/02* (2006.01)
(52) U.S. Cl.
  CPC ... *B60W 2050/143* (2013.01); *H04R 2499/13* (2013.01); *H04S 2400/11* (2013.01); *H04S 2400/15* (2013.01)
(58) Field of Classification Search
  USPC .......................................................... 381/86
  See application file for complete search history.

(56) References Cited

U.S. PATENT DOCUMENTS

| | | | |
|---|---|---|---|
| 2004/0260433 A1* | 12/2004 | Sawada | B60Q 9/006 701/1 |
| 2010/0060441 A1* | 3/2010 | Iwamoto | B60W 50/14 340/435 |
| 2012/0062391 A1* | 3/2012 | Pan | B60Q 5/008 340/901 |
| 2013/0214919 A1* | 8/2013 | Bassali | B60R 22/48 701/1 |
| 2014/0310739 A1* | 10/2014 | Ricci | H04W 4/021 725/75 |
| 2015/0110285 A1 | 4/2015 | Censo et al. | |

FOREIGN PATENT DOCUMENTS

| | | |
|---|---|---|
| DE | 10 2015 11 692 A1 | 1/2017 |
| DE | 10 2016 200 370 A1 | 7/2017 |
| JP | 2005-8020 A | 1/2005 |
| JP | 2014-151728 A | 8/2014 |
| JP | 2015-82844 A | 4/2015 |
| KR | 10-2012-0129116 A | 11/2012 |

OTHER PUBLICATIONS

German-language Written Opinion (PCT/ISA/237) issued in PCT Application No. PCT/DE2019/100591 dated Sep. 18, 2019 (six (6) pages).

German-language Search Report issued in German Application No. 10 2018 211 127.8 dated Mar. 21, 2019 with partial English translation (12 pages).

Korean-language Office Action issued in Korean Application No. 10-2020-7033864 dated Apr. 19, 2022 with English translation (10 pages).

* cited by examiner

AUDIO DEVICE FOR A VEHICLE AND METHOD FOR OPERATING AN AUDIO DEVICE FOR A VEHICLE

BACKGROUND AND SUMMARY OF THE INVENTION

The invention relates to an audio device for a vehicle and to a method for operating an audio device for a vehicle.

It is known from the related art that modern vehicles comprise more and more vehicle functions as well as driver assistance functions having ever-increasing scopes. These vehicle functions and driver assistance functions encompass highly diverse signal, advisory, and warning tones, which bring attention to certain situations or prompt the driver to take certain actions. These tones are usually played back via the audio system of the vehicle. Due to the high number of different tones and different functions, it can happen that the driver does not know exactly which situation he/she is being notified about or which action he/she is being prompted to take. It is not uncommon for the driver to then check, in that he/she additionally consults the displayed visual signals, such as a display in a display screen.

As a result, the driver is distracted from his/her actual driving task, however, whereby a safety risk arises.

The problem addressed by the invention is that of providing an audio device for a vehicle and a method for operating an audio device for a vehicle, which at least partially overcome the disadvantages from the related art.

The problem is solved by the features of the independent patent claims. Advantageous embodiments are described in the dependent claims. It is pointed out that additional features of a patent claim, which is dependent on an independent patent claim, can form an invention, which is separate and independent of the combination of all features of the independent claim, without the features of the independent patent claim or only in combination with a subset of the features of the independent patent claim, which can be made the subject matter of an independent claim, a divisional application, or a subsequent application. This applies in a similar way for technical teachings described in the description, which can form an invention independent of the features of the independent patent claims.

A first aspect of the invention relates to an audio device for a vehicle, wherein the audio device comprises a loudspeaker system. The loudspeaker system comprises multiple loudspeakers, which are spatially arranged in such a way that they provide for a three-dimensional listening experience in a vehicle interior. Moreover, the audio device comprises a control unit, which is coupled to the loudspeaker system and is designed for activating at least one loudspeaker of the loudspeaker system, in order to play back a position-specific warning signal, which is linked to a specific position. In order to play back the position-specific warning signal, the control unit activates only the loudspeaker or those loudspeakers of the loudspeaker system that is/are closest to the specific position.

A second aspect of the invention relates to a method for operating an audio device for a vehicle, which is equipped with a loudspeaker system comprising multiple loudspeakers spatially arranged in such a way that they provide for a three-dimensional listening experience in a vehicle interior. The method comprises the activation of at least one of the multiple loudspeakers of the loudspeaker system, in order to play back a position-specific warning signal, which is linked to a certain position. Only the loudspeaker or those loudspeakers of the multiple loudspeakers is/are activated that is/are closest to the certain position.

A vehicle within the scope of the present document is understood to be any type of vehicle, with the aid of which persons and/or goods can be moved. Possible examples thereof are: motor vehicle, truck, ground vehicles, busses, driver's cabs, cable cars, elevator cabs, rail vehicles, watercraft (for example, ships, boats, submarines, diving bells, hovercraft, hydrofoils), aircraft (planes, helicopters, ground effect vehicles, airships, balloons).

Preferably, the vehicle is a motor vehicle. A motor vehicle in this sense is a land vehicle, which is moved with the aid of machine power without being bound to rails. A motor vehicle in this sense comprises a car, a motorcycle, and a tractor.

The coupling, for example, the coupling between the loudspeaker system and the control unit, is understood to mean a communication link within the scope of the present document. The communication link can be wireless (for example, Bluetooth, WLAN, mobile radio communication) or hard-wired (for example, with the aid of a USB interface, data cable, etc.).

The audio device comprises a loudspeaker system including multiple loudspeakers. The loudspeakers are spatially arranged in such a way that they provide for a three-dimensional listening experience in a vehicle interior.

The vehicle interior within the scope of the present document comprises the occupant compartment of a vehicle, i.e., the space, in which the vehicle occupants are located, the interior trim, seats, seat benches, dashboard, any other instruments, operating elements, and the trunk of a vehicle.

A vehicle occupant within the scope of the present document is a living being, preferably a person, which is located in a vehicle. It makes no difference where the vehicle occupant is located or what type of activity the vehicle occupant performs.

The term three-dimensional listening experience means a listening experience in the horizontal and vertical directions. For this purpose, audio signals are distributed to the individual loudspeakers in such a way that different soundscapes can be generated. One possible soundscape can induce in a listener, for example, the sensation of being surrounded by the tones (for example, music, speech, sound effects). Similarly, the soundscape can be configured in such a way that the listener can associate it with a certain object or a certain direction. This can be achieved, for example, by utilizing audio methods that deliver object-based audio data to loudspeakers.

Due to the three-dimensional listening experience, audio signals can be precisely played back depending on a certain direction or a certain position. As a result, the intuitive perception of audio signals from a certain direction or from a certain position is increased. This means, a vehicle occupant in a vehicle interior can have a three-dimensional listening experience due to the certain arrangement of the loudspeakers and can distinguish whether the audio signals fill a space around him/her or come from a certain direction or from a certain position.

In order to play back a position-specific warning signal, the control unit activates at least one loudspeaker of the loudspeaker system. In other words, the control unit triggers at least one loudspeaker of the loudspeaker system to play back a position-specific warning signal. For example, the control unit delivers object-based audio data to the appropriate loudspeaker of the loudspeaker system.

As described above, the control unit is communicatively linked to the loudspeaker system. The term position-specific warning signal means that the warning signal is linked to a certain position. In other words, only one certain loudspeaker or only certain loudspeakers of the loudspeaker system is/are activated, so that a vehicle occupant perceives the warning signal to be coming from a certain position. This means, this warning signal is not played back by all loudspeakers of the loudspeaker system, but rather that individual loudspeakers are selected and activated in a targeted manner for the playback of the position-specific warning signal. As a result, a listener is given the impression that the warning signal is coupled to a specific position. The listener can therefore intuitively associate the warning signal with the specific position.

The term warning signal is understood, in the present document, to be an audible signal, which indicates a potential or acute danger or an action that is impending or is to be carried out.

Preferably, the warning signal relates to one or multiple certain vehicle function(s) and/or an operating condition of one or multiple vehicle function(s) and/or one or multiple vehicle part(s) and/or a condition of one or multiple vehicle part(s).

Examples of vehicle functions are: tire pressure measurement, seat occupancy, vehicle occupant seat belt usage, obstacle detection, blind spot obstacle detection, lateral collision detection, front collision detection, rear collision detection, object detection, surroundings detection, etc.

Examples of vehicle parts are: flap, window, tailgate, hatchback, engine hood, trunk lid, cargo space door, sliding roof, folding roof, fuel filler door, door, convertible top, vehicle seat belt, tire, vehicle seat, etc.

A control unit within the scope of the present document is understood to be a centralized or decentralized system, which is provided for receiving, processing, outputting and, if necessary, storing information, for example, in the form of signals and/or data. The control unit can be a device in the vehicle, for example, the on-board computer, the navigation device, the infotainment system, etc. Alternatively, the control unit or individual parts of the control unit can be an external device and/or a mobile terminal. A control unit within the scope of the present document comprises, in particular, at least one central processing unit (CPU, microcontroller, etc.) and, if necessary, a memory unit. Moreover, the control unit can comprise encoders and/or decoders, which process received information for the processing by the central processing unit and/or prepare information, which is to be output, for the output (i.e., for the transmission), in particular via a data transmission system (for example, a BUS system).

In order to play back the position-specific warning signal, only the loudspeaker or those loudspeakers is/are activated that is/are closest to the certain position. In other words, only the loudspeakers are activated that are closest to the location from which a vehicle occupant is to perceive the warning signal.

Due to the audio device for a vehicle described herein, the vehicle occupants are enabled to intuitively perceive warning signals, classify them and, if necessary, take appropriate measures. As a result, for example, the driver of the vehicle is not unnecessarily distracted from his/her task of driving the vehicle.

According to embodiments that can be combined with other embodiments described herein, the position-specific warning signal is linked to a certain position in the vehicle interior. The warning signal therefore relates to a certain position in the vehicle interior. In other words, the warning signal gives a vehicle occupant the impression that it originates from a certain position in the vehicle interior. For this purpose, the particular loudspeaker or the particular loudspeakers, which is/are closest to the certain position in the vehicle interior, is/are activated, in order to play back the warning signal. If the "open door" warning signal is to sound, for example, from the right rear vehicle door, the loudspeaker or the loudspeakers next to the rear right vehicle door is/are activated.

According to embodiments that can be combined with other embodiments described herein, the position-specific warning signal is generated in that the sound settings of audio signals emitted via the loudspeaker system are changed at the loudspeaker or the loudspeakers of the loudspeaker system that is/are closest to the certain position. In other words, the warning signal is generated, in that the sound settings of emitted audio signals are changed only at a certain loudspeaker or at certain loudspeakers (namely the loudspeaker or the loudspeakers that is/are closest to the certain position). The sound settings can comprise parameters for sound control, for example, parameters of an equalizer. The sound settings can comprise, for example, the treble, the bass, and/or the volume. The term "emitted audio signals" is understood to be continuously played back audio signals, such as music, messages, audio books, telephone conversations, video conference, etc. The audio signals are therefore played back via the loudspeaker system, for example, the radio is on and, at some point, the sound settings are changed at a certain loudspeaker or at certain loudspeakers. Due to the perception of the changed sound settings, a vehicle occupant can intuitively associate this change with a warning signal.

For example, a music playback that is underway can be adapted in order to play back a position-specific warning signal, in such a way that the sound of the music playback changes only in one certain spatial direction, in particular with respect to the driver. Such a change could be implemented, for example, with the aid of dynamic frequency adaptations of the playback with respect to a direction.

According to embodiments that can be combined with other embodiments described herein, the sound settings comprise settings for bass and treble of the audio signals; the sound settings can be changed with the aid of raising or lowering the bass and/or raising or lowering the treble. A vehicle occupant therefore perceives the position-specific warning signal in that he/she perceives a change of the sound of the audio signals at a certain loudspeaker and/or at certain loudspeakers during the playback of audio signals. For example, a raising of the bass at a rear right loudspeaker can be perceived as a position-specific warning signal from this rear right loudspeaker. If the treble of the music playback is considerably audibly raised only at a certain loudspeaker at the front right (i.e., at the passenger seat) during the playback of music via all loudspeakers, a vehicle occupant perceives this change at the front right and can associate it with a position-specific warning signal.

In addition to a warning signal generated via changed sound settings, a further warning signal, for example, a loud signal tone, can be played back via one or multiple loudspeaker(s). As a result, the perception of the warning signal is further intensified.

According to embodiments that can be combined with other embodiments described herein, the control unit is further designed for receiving object data regarding an object detected in the surroundings of the vehicle and, depending on the received object data, varying the content of the position-specific warning signal.

Examples of an object in the surroundings of the vehicle are: pedestrian, child, adult, wheelchair user, cyclist, parking automobile, plant container, animal, and cat, etc.

The term object data means data that describe the object. Examples of such object data are: size, length, width, depth, consistency, speed, acceleration, weight, etc.

The term surroundings means the area surrounding the vehicle. The surrounding area relates to a radius of 3 m to 6 m, preferably 2 m to 5 m, around the vehicle, when the vehicle center is assumed to be a starting point.

The object data regarding an object detected in the surroundings of the vehicle can be ascertained with the aid of a detection device arranged in the vehicle and/or at the vehicle and/or external to the vehicle. For this purpose, the detection device can comprise a sensor system. The sensor system comprises at least one of the following devices: ultrasonic sensor, radar sensor (for example, close-range radar sensor, long-range radar sensor), LIDAR sensor, thermal camera system, video system, and/or image sensor (for example, camera). The data (i.e., the object data in the present case) of the sensor system can originate from one of the aforementioned devices or from a combination of several of the aforementioned devices (sensor data fusion).

In order to receive the object data, the detection device is coupled to the control unit.

The content of the position-specific warning signal is varied depending on the received object data. The term "content of the position-specific warning signal" means the melody, the sequence of tones, the tones, and/or the length of the warning signal. Depending on the content of the position-specific warning signal, a certain object or a certain object class can be inferred.

The position-specific warning signal can comprise, for example, the ringing of a bicycle bell, in order to warn that a cyclist is approaching the vehicle. Moreover, the position-specific warning signal can comprise a sound of children laughing, in order to indicate that a child is located in the surroundings of the vehicle. The position-specific warning signal can comprise, for example, the sound of a train, in order to draw attention to the fact that a railroad crossing is being approached. One further example of the content of a position-specific warning signal is a certain noise, for example, a beep or a whistle, which draws attention to an open door or an open tailgate. The type of warning tone (i.e., the content of the warning signal) enables a certain vehicle function or a certain vehicle part to be inferred. As a result, a vehicle occupant is capable of intuitively inferring the vehicle function and/or the vehicle part for which the warning signal is intended.

The content of the position-specific warning signal therefore indicates what the warning is about. Due to the fact that the warning signal is played back in a position-specific manner, a piece of information regarding the position or the direction from which the warning originates is additionally transmitted. A vehicle occupant therefore intuitively receives information regarding a warning.

According to embodiments that can be combined with other embodiments described herein, the control unit is designed for playing back a course of a position-specific warning signal, wherein the control unit activates at least two loudspeakers of the loudspeaker system, one after the other, in order to play back the course of the position-specific warning signal. In other words, the position-specific warning signal is initially played back on a loudspeaker; thereafter, in order to play back this position-specific warning signal, the loudspeaker is switched, in order to play back a course of the position-specific warning signal. The playback of the course of the position-specific warning signal is therefore essentially not played back simultaneously on two or more loudspeakers, but rather one after the other on two or more loudspeakers. During the switch of the loudspeakers, a brief, simultaneous playback of the warning signal on two or more loudspeakers may take place. In other words, the playback on the one loudspeaker can transition into the playback on another loudspeaker ("crossfade").

One example of a course of a position-specific warning signal is the initial playback of a bicycle bell on a right rear loudspeaker, wherein the playback of the bicycle bell is continued on a front right loudspeaker. As a result, a cyclist riding past the vehicle is simulated and a vehicle occupant can be warned.

According to embodiments that can be combined with other embodiments described herein, the control unit is further designed for receiving object data regarding an object detected in the surroundings of the vehicle and, depending on the received object data, changing the sound settings of audio signals emitted via the loudspeaker system at the loudspeaker or the loudspeakers of the loudspeaker system that is/are closest to the detected object. Thereafter, the control unit can vary the content of the position-specific warning signal generated in this way. One example of the described application is the approach by a cyclist into the surroundings of the vehicle. In order not to initially unnecessarily irritate the driver, a position-specific warning signal is first generated at the loudspeaker that is closest to the cyclist, in that the treble of the audio playback at this loudspeaker is lowered. If the driver does not respond to this warning signal, a bicycle bell can be emitted as a warning signal via the loudspeaker that is closest to the cyclist at this point in time.

According to embodiments that can be combined with other embodiments described herein, the audio device comprises a selection unit, which is designed for providing a certain selection of contents of a warning signal for the assignment of a certain content to a certain vehicle function and/or a certain vehicle part. In other words, with the aid of the selection unit, a certain content of a warning signal, for example, a fanfare melody, can be assigned to a certain vehicle part, for example, a vehicle door. If, for example, the warning signal for an open vehicle door is played back, a fanfare melody sounds. This fanfare melody sounds only on the loudspeaker or on the loudspeakers that is/are closest to the particular open vehicle door.

According to one further embodiment, the certain selection of contents of a warning signal provided by the selection unit is freely configurable. For example, the warning signal for an open vehicle door can be configured as a beep and the warning signal for a dog detected in the surroundings of the vehicle can be configured as dog barking.

According to embodiments that can be combined with other embodiments described herein, the multiple loudspeakers comprise vehicle seat loudspeakers. At least one vehicle seat loudspeaker is assigned to each vehicle seat. The position-specific warning signal is a seat belt reminder signal. In order to play back the seat belt reminder signal, the control unit activates only the vehicle seat loudspeaker or those vehicle seat loudspeakers that is/are assigned to the vehicle seat for which the seat belt reminder signal is intended.

At least one vehicle seat loudspeaker is assigned to each vehicle seat. The term "assignment" includes an arrangement of one or multiple vehicle seat loudspeaker(s) in the proximity of the particular vehicle seat. For example, the vehicle seat loudspeaker or the vehicle seat loudspeakers can be mounted in or at the particular vehicle seat. Alternatively or additionally, the vehicle seat loudspeaker or the vehicle seat loudspeakers can be arranged in a roof lining area over the particular vehicle seat. Alternatively or additionally, the vehicle seat loudspeaker or the vehicle seat loudspeakers can be arranged in a floor area under the particular vehicle seat. Alternatively or additionally, the vehicle seat loudspeaker or the vehicle seat loudspeakers can be arranged in a side lining next to the particular vehicle seat. Due to the arrangement of the vehicle seat loudspeakers in the proximity of the particular vehicle seat, the seat belt reminder signal can be perceived by a vehicle occupant as a warning signal, which originates from the particular vehicle seat.

According to embodiments that can be combined with other embodiments described herein, the multiple loudspeakers comprise tire loudspeakers. At least one tire loudspeaker is assigned to each tire. The position-specific warning signal is a low tire pressure signal or a flat tire signal. In order to play back the low tire pressure signal or the flat tire signal, the control unit activates only the tire loudspeaker or those tire loudspeakers that is/are assigned to the tire for which the low tire pressure signal or the flat tire signal is intended. Due to the arrangement of the tire loudspeakers in the proximity of the particular tire, the low tire pressure signal or a flat tire signal can be instinctively perceived by a vehicle occupant as a warning signal, which originates from the particular defective tire.

At least one tire loudspeaker is assigned to each tire. The term "assignment" includes an arrangement of one or multiple tire loudspeaker(s) in the proximity of the particular tire. For example, a tire loudspeaker or multiple tire loudspeakers, which is/are assigned to the front right tire (i.e., the tire on the passenger side), can be arranged in the dashboard on the passenger side and/or in or at the side lining on the passenger side and/or in the roof lining area on the passenger side and/or in the floor area on the passenger side and/or in or at the passenger vehicle seat.

According to embodiments that can be combined with other embodiments described herein, the multiple loudspeakers comprise flap loudspeakers. At least one flap loudspeaker is assigned to each flap. The position-specific warning signal is a flap signal, which signals the state of an open flap. In order to play back the flap signal, the control unit activates only the flap loudspeaker or those flap loudspeakers that is/are assigned to the flap for which the flap signal is intended.

Examples of a flap within the scope of the present document are: tailgate, hatchback, engine hood, trunk lid, cargo space door, sliding roof, folding roof, fuel filler door, door, window, convertible top, etc.

Preferably, the flap is a door. A front door is arranged in the front part of a vehicle, i.e., on the driver side or the passenger side. A rear door is arranged in the rear part of a vehicle, i.e., in the rear compartment.

The flap signal signals the state of an open flap. Examples of a state of an open flap include: open door, open fuel filler door, open hatchback, open sliding roof, open window, etc.

At least one flap loudspeaker is assigned to each flap. The term "assignment" includes an arrangement of one or multiple flap loudspeaker(s) in the proximity of the particular flap. For example, a flap loudspeaker assigned to the driver door is arranged in the dashboard on the driver side and/or in or at the side lining on the driver side and/or in or at the driver seat. A flap loudspeaker assigned to the hatchback can be arranged, for example, in or at the roof lining that spans the trunk.

According to one further embodiment, a vehicle comprising one or a combination of the above-described embodiments of the audio device is provided.

The preceding comments regarding an audio device for a vehicle according to the first aspect of the invention also apply, in a corresponding way, for the method for operating an audio device for a vehicle according to the second aspect of the invention and vice versa; advantageous exemplary embodiments of the method according to the invention correspond to the described advantageous exemplary embodiments of the audio device according to the invention. At this point, non-explicitly described, advantageous exemplary embodiments of the method according to the invention correspond to the described advantageous exemplary embodiments of the audio device according to the invention.

Further advantages, features, and details of the present invention result from the description of preferred embodiments, below, and with reference to the drawings. The features and combinations of features mentioned above in the description, as well as the features and combinations of features mentioned in the following in the description of the figures and/or shown individually in the figures, are usable not only in the particular combination indicated, but also in other combinations or alone, without departing from the scope of the invention.

The invention is described in the following with reference to exemplary embodiments with the aid of the attached drawings.

DETAILED DESCRIPTION OF THE DRAWINGS

Figure 1:
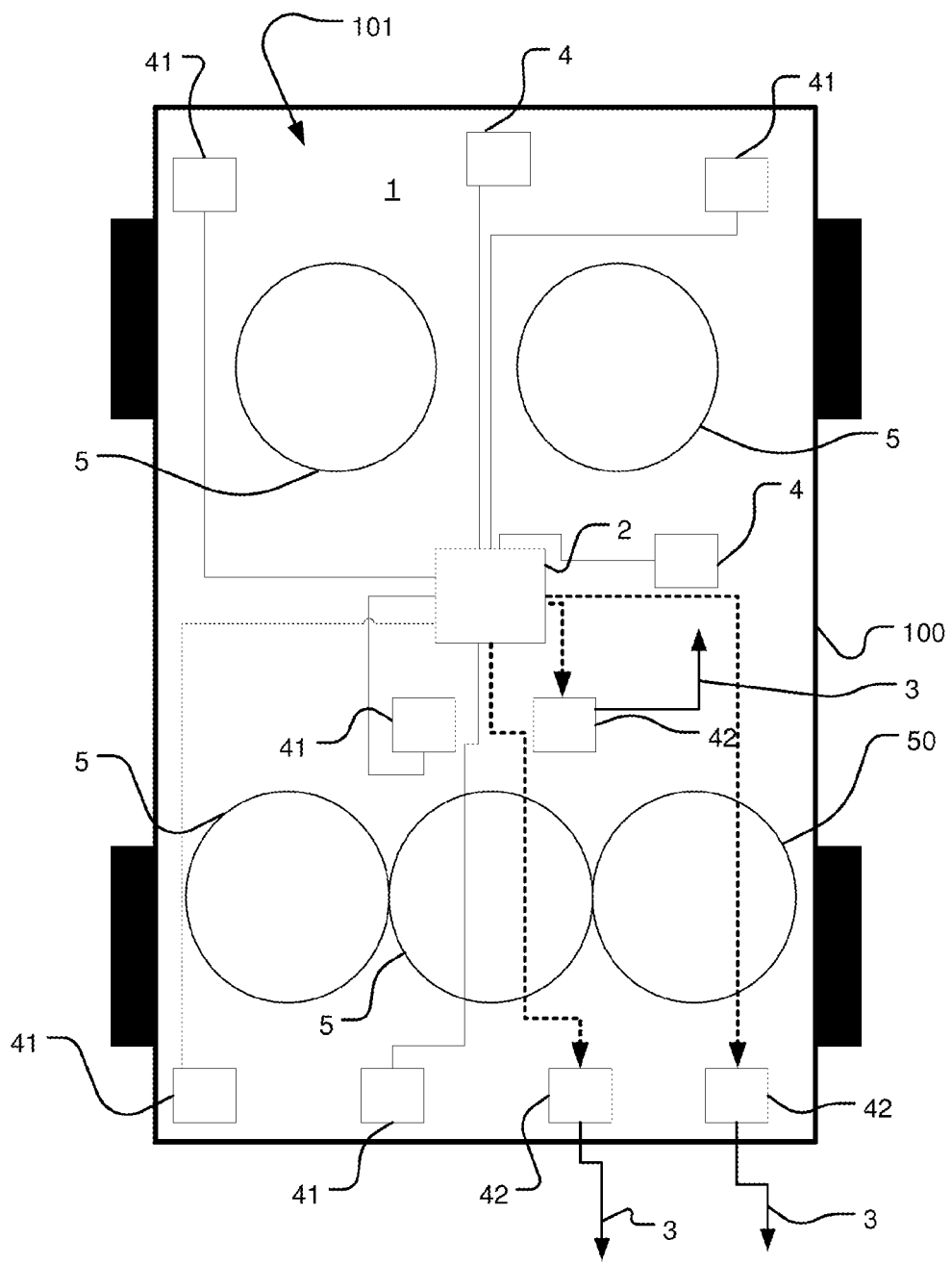
FIG. 1 schematically shows an audio device for a vehicle according to one specific embodiment.

FIG. 1 shows a vehicle 100 comprising an audio device 1. The vehicle 100 comprises five vehicle seats 5, 50 in the vehicle interior 101, wherein two vehicle seats 5 are arranged in the front part of the vehicle 100 and three vehicle seats 5, 50 are arranged in the rear part of the vehicle 100. The audio device 1 comprises a loudspeaker system including multiple loudspeakers 41, 42. The loudspeakers 41, 42 are arranged in such a way that they provide for a three-dimensional listening experience in the vehicle interior 101. Some of the loudspeakers are vehicle seat loudspeakers 41, 42. Vehicle seat loudspeakers 41, 42 are loudspeakers that are arranged at or near a certain vehicle seat 5, 50. The vehicle seat loudspeakers 41, 42 are utilized for playing back audio signals in the vehicle interior 101 in such a way that a vehicle occupant can associate these with a certain vehicle seat 5, 50. Moreover, the audio device 1 comprises a control unit 2 communicatively linked to the loudspeaker system. The control unit 2 activates the loudspeakers 41, 42 of the loudspeaker system in order to play back audio signals, such as warning signals. In order to play back a seat belt reminder signal 3, the control unit 2 activates only those vehicle seat loudspeakers 42 that are assigned to the vehicle seat 50 for which the seat belt reminder signal 3 is intended. As is apparent in FIG. 1, the vehicle seat loudspeakers 42 located in close proximity to the right rear vehicle seat 50 are assigned to this certain vehicle seat 50. If a seat belt reminder signal 3 is now to be played back for the vehicle seat 50, the vehicle seat loudspeakers 42 are activated by the control unit 2, in order to play back the seat belt reminder signal 3. In this way, the driver or another vehicle occupant hears the seat belt reminder signal 3 coming from the direction in which the vehicle seat 50 is located, for which the seat belt reminder signal 3 is intended. As a result, the driver intuitively understands that the vehicle occupant on the right rear vehicle seat 50 has not buckled up and can instruct him/her to do so.

Figure 2:
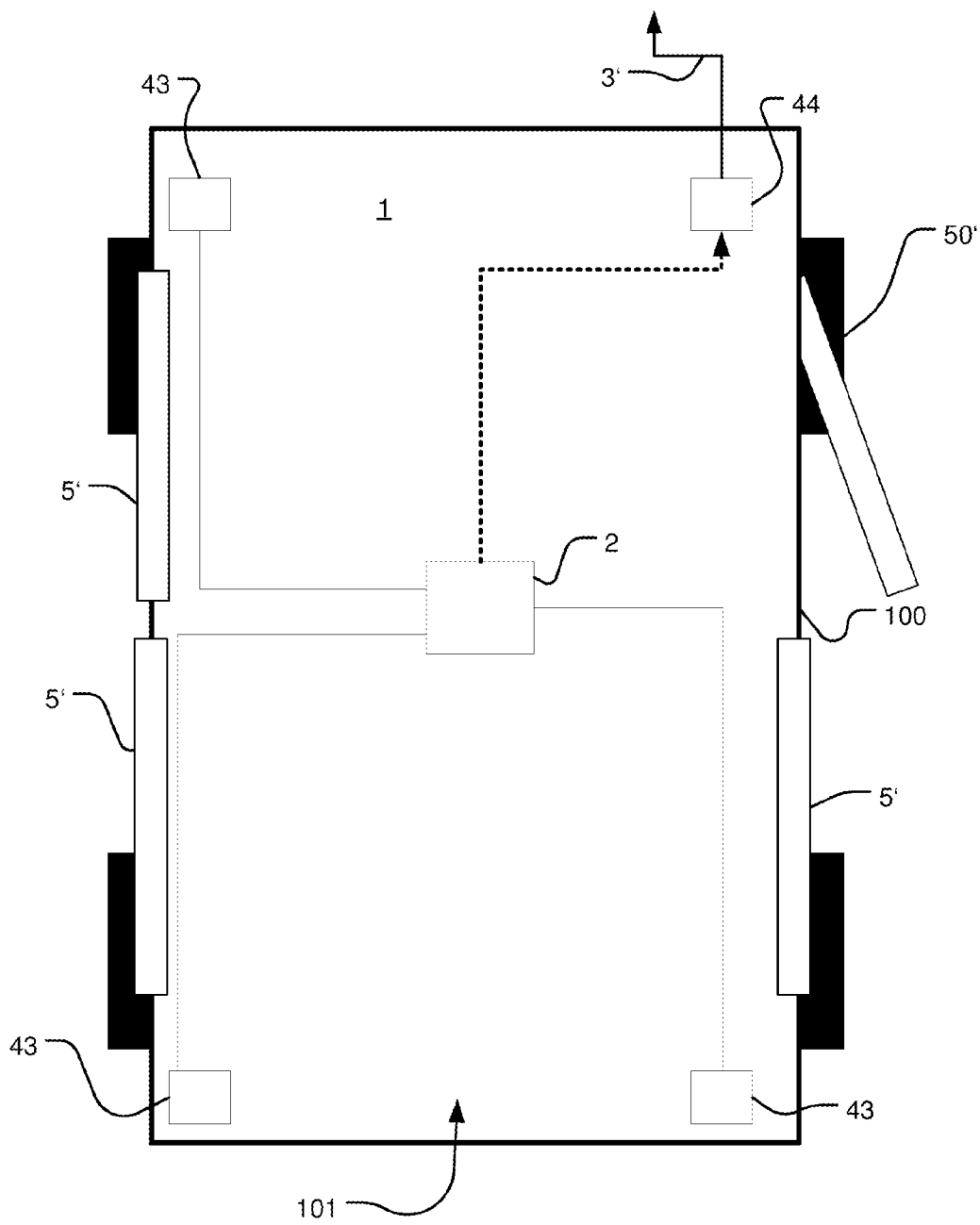
FIG. 2 schematically shows an audio device for a vehicle according to one specific embodiment.

FIG. 2 shows a vehicle 100 comprising an audio device 1 and four vehicle doors 5', 50'. The audio device 1 comprises a loudspeaker system in the vehicle interior 101, which comprises door loudspeakers 43, 44, wherein one door loudspeaker 43, 44 is assigned to each vehicle door 5', 50'. In order to play back a door warning signal 3' that signals an open door, a control unit 2 communicatively linked to the loudspeaker system activates only that door loudspeaker 44 for which the door warning signal 3' is intended. In FIG. 2, the passenger door 50' of the vehicle 100 is open. If a door warning signal 3' intended for the passenger door 50' is now to be played back, the control unit 2 activates the door loudspeaker 44. Due to the fact that the warning signal sounds from the direction of the passenger door 50', the driver of the vehicle 100 can intuitively associate the warning signal with the open passenger door 50'.

Figure 3:
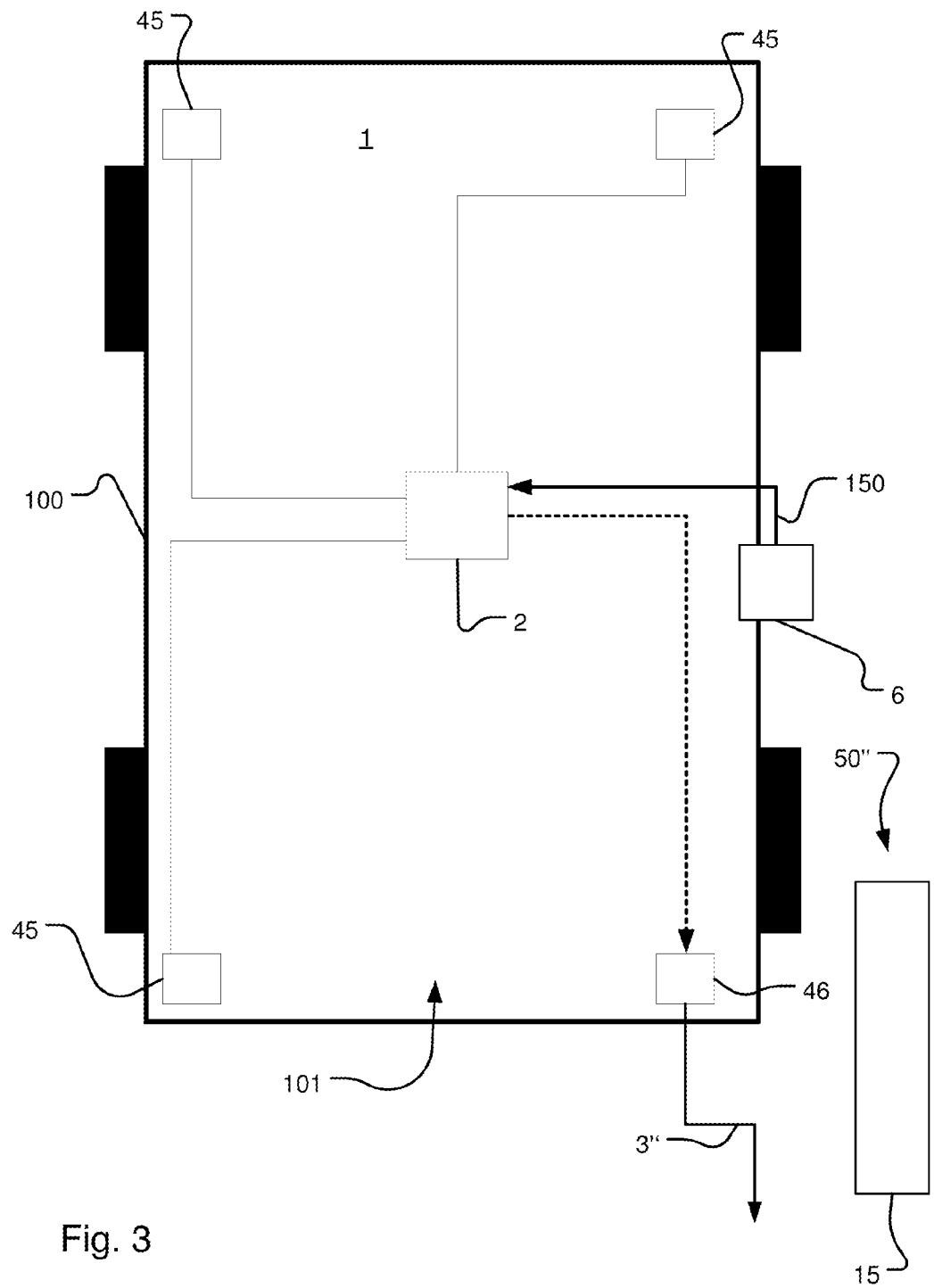
FIG. 3 schematically shows an audio device for a vehicle according to one specific embodiment.

FIG. 3 shows a vehicle 100 comprising an audio device 1, which encompasses a loudspeaker system in the vehicle interior 101 comprising four loudspeakers 45, 46. The loudspeaker system is communicatively linked to a control unit 2 in order to play back a position-specific warning signal 3". Moreover, the control unit 2 is communicatively linked to a detection device 6. The detection device 6 comprises a sensor system and is designed for detecting objects in the surroundings of the vehicle 100. If, for example, a cyclist 15 is detected in the right rear surroundings 50" of the vehicle 100 by the detection device 6, the corresponding object data 150 are transmitted by the detection device 6 to the control unit 2. Subsequently, the control unit 2 triggers the loudspeaker 46 closest to the right rear surroundings 50" to play back a bicycle bell 3". As a result, the vehicle occupants, in particular the driver, can be instinctively warned about a cyclist approaching from the right rear. If the detection device 6 detects that the cyclist 15 is approaching the vehicle 100 very rapidly, the bicycle bell 3" can be played back louder and/or faster, i.e., the sequence of tones is played back louder and/or faster.

What is claimed is:

1. An audio device for a vehicle, comprising:
a loudspeaker system comprising multiple loudspeakers spatially arranged so as to provide for a three-dimensional listening experience in a vehicle interior;
a control unit, which is coupled to the loudspeaker system and is configured for activating at least one loudspeaker of the loudspeaker system, in order to play back a position-specific warning signal, which is linked to a specific position, wherein,
in order to play back the position-specific warning signal, the control unit activates only the loudspeaker or those loudspeakers of the loudspeaker system that is/are closest to the specific position;
the position-specific warning signal is generated in that sound settings of audio signals emitted via the loudspeaker system are changed at the loudspeaker or those loudspeakers of the loudspeaker system that is/are closest to the specific position;
the sound settings comprise settings for bass and treble of the audio signals and the sound settings are changed by raising or lowering the bass and/or raising or lowering the treble.

2. The audio device according to claim 1, wherein the position-specific warning signal is linked to a certain position in the vehicle interior.

3. The audio device according to claim 1, wherein the control unit is further configured for receiving object data regarding an object detected in surroundings of the vehicle and, depending on the received object data, varying content of the position-specific warning signal.

4. The audio device according to claim 1, wherein
the multiple loudspeakers comprise vehicle seat loudspeakers, wherein at least one vehicle seat loudspeaker is assigned to each vehicle seat,
the position-specific warning signal is a seat belt reminder signal, and
in order to play back the seat belt reminder signal, the control unit activates only the vehicle seat loudspeaker or those vehicle seat loudspeakers that is/are assigned to the vehicle seat for which the seat belt reminder signal is intended.

5. The audio device according to claim 1, wherein
the vehicle comprises four tires,
the multiple loudspeakers comprise tire loudspeakers, wherein at least one tire loudspeaker is assigned to each of the four tires,
the position-specific warning signal is a low tire pressure signal or a flat tire signal, and
in order to play back the low tire pressure signal or the flat tire signal, the control unit activates only the tire loudspeaker or those tire loudspeakers that is/are assigned to the tire for which the low tire pressure signal or the flat tire signal is intended.

6. The audio device according to claim 1, wherein
the vehicle comprises four flaps,
the multiple loudspeakers comprise flap loudspeakers, wherein at least one flap loudspeaker is assigned to each of the four flaps,
the position-specific warning signal is a flap signal, which signals an open flap, and
in order to play back the flap signal, the control unit activates only the flap loudspeaker or those flap loudspeakers that is/are assigned to the flap for which the flap signal is intended.

7. The audio device according to claim 1, wherein the audio signals emitted via the loudspeaker system in which the sound settings are changed to generate the position-specific warning signal are at least one of:
music,
a message,
an audio book,
a telephone conversation, or
a video conference.

8. The audio device according to claim 1, wherein
the audio signals emitted via the loudspeaker system, in which the sound settings are changed to generate the position-specific warning signal, comprise music; and
the position-specific warning signal is generated by changing the sound settings of the music at a single loudspeaker while playback of the music is already underway using all the multiple loudspeakers.

9. The audio device according to claim 8, wherein the control unit is further configured to:
play back a sound clip having a certain content after a driver of the vehicle does not respond to the generated position-specific warning signal.

10. The audio device according to claim 1, wherein
the position-specific warning signal is played back consecutively across two or more loudspeakers of the multiple loudspeakers.

11. A vehicle comprising an audio device according to claim 1.

12. A method for operating an audio device for a vehicle, which is equipped with a loudspeaker system comprising multiple internal loudspeakers spatially arranged such that the multiple loudspeaker provide for a three-dimensional listening experience in a vehicle interior, wherein the method comprises:
  generating a position-specific warning signal which is linked to a certain position, wherein
    the position-specific warning signal is generated by changing sound settings of audio signals emitted via the loudspeaker system at the loudspeaker or those loudspeakers of the loudspeaker system that is/are closest to the certain position; and
    the sound settings comprise settings for bass and treble of the audio signals and the sound settings are changed by raising or lowering the bass and/or raising or lowering the treble.

13. A method for operating an audio device for a vehicle, which is equipped with a loudspeaker system comprising multiple loudspeakers spatially arranged such that the multiple loudspeaker provide for a three-dimensional listening experience in a vehicle interior, wherein the method comprises:
  playing back continuous music via the multiple loudspeakers of the loudspeaker system;
  receiving object data regarding an object detected in surroundings of the vehicle;
  providing a first warning in response to the detected object by changing sound settings of one or more loudspeakers of the loudspeaker system playing back the continuous music, wherein
    the changing of the sound settings comprises:
      raising or lowering a setting for bass and/or raising or lowering a setting for treble of the continuous music; and
  providing a second warning by playing back a certain content via a loudspeaker of the multiple loudspeakers.

14. The method of claim 13, wherein
the first warning is played back via only one speaker of the multiple loudspeakers that is closest to the detected object.

15. The method of claim 13, wherein
the second warning is played back via only one speaker of the multiple loudspeakers that is closest to the detected object.

16. The method of claim 13, wherein
the second warning is provided:
  following the first warning, and
  while the playing back of the music is underway.

17. The method of claim 13, wherein
the second warning is provided in response to a driver of the vehicle not responding to the first warning.

18. The method according to claim 12, wherein
the audio signals emitted via the loudspeaker system in which the sound settings are changed to generate the position-specific warning signal are at least one of:
  music,
  a message,
  an audio book,
  a telephone conversation, or
  a video conference.

* * * * *